United States Patent
Eran et al.

(10) Patent No.: US 11,184,439 B2
(45) Date of Patent: Nov. 23, 2021

(54) COMMUNICATION WITH ACCELERATOR VIA RDMA-BASED NETWORK ADAPTER

(71) Applicant: Mellanox Technologies, Ltd., Yokneam (IL)

(72) Inventors: Haggai Eran, Yokneam Illit (IL); Dotan David Levi, Kiryat Motzkin (IL); Maxim Fudim, Ashdod (IL); Liran Liss, Atzmon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/827,912

(22) Filed: Mar. 24, 2020

(65) Prior Publication Data

US 2020/0314181 A1    Oct. 1, 2020

Related U.S. Application Data

(60) Provisional application No. 62/827,223, filed on Apr. 1, 2019.

(51) Int. Cl.
*H04L 29/08* (2006.01)
*G06F 13/28* (2006.01)
*G06F 15/173* (2006.01)

(52) U.S. Cl.
CPC .......... *H04L 67/1097* (2013.01); *G06F 13/28* (2013.01); *G06F 15/17331* (2013.01)

(58) Field of Classification Search
CPC .................. G06F 13/28; G06F 13/4022; G06F 15/17331; H04L 67/10; H04L 67/1097
(Continued)

(56) References Cited

U.S. PATENT DOCUMENTS 6,901,496 B1  5/2005  Mukund et al.
7,657,659 B1  2/2010  Lambeth et al.
(Continued)

FOREIGN PATENT DOCUMENTS

EP    1657878 A1    5/2006
EP    2463782 A2    6/2012
WO    2010062679 A1    6/2010

OTHER PUBLICATIONS

"Extended Task Queuing: Active Messages for Heterogeneous Systems", LeBeane et al., IEEE, SC'16: Proceedings of the International Conference for High Performance Computing, Networking, Storage and Analysis. 2016. Whole Document. (Year: 2016).*
(Continued)

*Primary Examiner* — Tonia L Dollinger
*Assistant Examiner* — Jonathan A Sparks
(74) *Attorney, Agent, or Firm* — Kligler & Associates Patent Attorneys Ltd

(57) ABSTRACT

A network node includes a bus switching element, and a network adapter, an accelerator and a host, all coupled to communicate via the bus switching element. The network adapter is configured to communicate with remote nodes over a communication network. The host is configured to establish a RDMA link between the accelerator and the RDMA endpoint by creating a Queue Pair (QP) to be used by the accelerator for communication with the RDMA endpoint via the RDMA link. The accelerator is configured to exchange data, via the network adapter, between a memory of the accelerator and a memory of the RDMA endpoint.

20 Claims, 9 Drawing Sheets

(58) Field of Classification Search
USPC .................................................... 709/217
See application file for complete search history.

(56) References Cited

U.S. PATENT DOCUMENTS

| | | | |
|---|---|---|---|
| 8,006,297 B2 | 8/2011 | Johnson et al. | |
| 8,103,785 B2 | 1/2012 | Crowley et al. | |
| 8,824,492 B2 | 9/2014 | Wang et al. | |
| 9,038,073 B2 | 5/2015 | Kohlenz et al. | |
| 9,678,818 B2 | 6/2017 | Raikin et al. | |
| 9,904,568 B2 | 2/2018 | Vincent et al. | |
| 10,078,613 B1 | 9/2018 | Ramey | |
| 10,120,832 B2 | 11/2018 | Raindel et al. | |
| 10,152,441 B2 | 12/2018 | Liss et al. | |
| 10,210,125 B2 | 2/2019 | Burstein | |
| 10,218,645 B2 | 2/2019 | Raindel et al. | |
| 10,382,350 B2 | 8/2019 | Bohrer et al. | |
| 10,708,240 B2 | 7/2020 | Menachem et al. | |
| 10,956,346 B1* | 3/2021 | Ben-Yehuda | G06F 12/10 |
| 2003/0023846 A1 | 1/2003 | Krishna et al. | |
| 2004/0039940 A1 | 2/2004 | Cox et al. | |
| 2004/0057434 A1 | 3/2004 | Poon et al. | |
| 2004/0158710 A1 | 8/2004 | Buer et al. | |
| 2005/0102497 A1 | 5/2005 | Buer | |
| 2008/0147822 A1* | 6/2008 | Benhase | G06F 9/546 709/217 |
| 2008/0313364 A1 | 12/2008 | Flynn et al. | |
| 2009/0086736 A1 | 4/2009 | Foong et al. | |
| 2009/0106771 A1 | 4/2009 | Benner et al. | |
| 2010/0228962 A1 | 9/2010 | Simon et al. | |
| 2011/0119673 A1* | 5/2011 | Bloch | H04L 67/10 718/102 |
| 2011/0246597 A1 | 10/2011 | Swanson et al. | |
| 2012/0314709 A1 | 12/2012 | Post et al. | |
| 2013/0080651 A1 | 3/2013 | Pope et al. | |
| 2013/0125125 A1 | 5/2013 | Karino et al. | |
| 2013/0142205 A1 | 6/2013 | Munoz | |
| 2013/0263247 A1 | 10/2013 | Jungck et al. | |
| 2013/0329557 A1 | 12/2013 | Petry | |
| 2013/0347110 A1 | 12/2013 | Dalal | |
| 2014/0129741 A1 | 5/2014 | Shahar et al. | |
| 2014/0185616 A1 | 7/2014 | Bloch et al. | |
| 2014/0254593 A1 | 9/2014 | Mital et al. | |
| 2014/0282561 A1 | 9/2014 | Holt et al. | |
| 2015/0100962 A1 | 4/2015 | Morita et al. | |
| 2015/0288624 A1 | 10/2015 | Raindel et al. | |
| 2015/0347185 A1 | 12/2015 | Holt et al. | |
| 2015/0355938 A1 | 12/2015 | Jokinen et al. | |
| 2016/0065659 A1* | 3/2016 | Bloch | H04L 67/10 709/201 |
| 2016/0132329 A1 | 5/2016 | Gupte et al. | |
| 2016/0226822 A1 | 8/2016 | Zhang et al. | |
| 2016/0306668 A1* | 10/2016 | Heil | G06F 9/5077 |
| 2016/0330112 A1 | 11/2016 | Raindel et al. | |
| 2016/0330301 A1 | 11/2016 | Raindel et al. | |
| 2016/0342547 A1 | 11/2016 | Liss et al. | |
| 2016/0350151 A1 | 12/2016 | Zou et al. | |
| 2016/0378529 A1 | 12/2016 | Wen | |
| 2017/0075855 A1 | 3/2017 | Sajeepa et al. | |
| 2017/0180273 A1 | 6/2017 | Daly et al. | |
| 2017/0237672 A1 | 8/2017 | Dalal | |
| 2017/0286157 A1 | 10/2017 | Hasting et al. | |
| 2017/0371835 A1* | 12/2017 | Ranadive | G06F 9/544 |
| 2018/0004954 A1 | 1/2018 | Liguori et al. | |
| 2018/0067893 A1 | 3/2018 | Raindel et al. | |
| 2018/0109471 A1 | 4/2018 | Chang et al. | |
| 2018/0114013 A1 | 4/2018 | Sood et al. | |
| 2018/0167364 A1 | 6/2018 | Dong et al. | |
| 2018/0219770 A1 | 8/2018 | Wu et al. | |
| 2018/0219772 A1 | 8/2018 | Koster et al. | |
| 2018/0246768 A1 | 8/2018 | Palermo et al. | |
| 2018/0329828 A1 | 11/2018 | Apfelbaum et al. | |
| 2019/0012350 A1 | 1/2019 | Sindhu et al. | |
| 2019/0026157 A1 | 1/2019 | Suzuki et al. | |
| 2019/0116127 A1 | 4/2019 | Pismenny et al. | |
| 2019/0140979 A1 | 5/2019 | Levi et al. | |
| 2019/0163364 A1 | 5/2019 | Gibb et al. | |
| 2020/0012604 A1 | 1/2020 | Agarwal | |
| 2020/0026656 A1 | 1/2020 | Liao et al. | |
| 2020/0401440 A1* | 12/2020 | Sankaran | G06F 9/383 |

OTHER PUBLICATIONS

Shirey., "Internet Security Glossary, Version 2", Request for Comments 4949, pp. 1-365, Aug. 2007.
Information Sciences Institute, "Transmission Control Protocol; DARPA Internet Program Protocol Specification", Request for Comments 793, pp. 1-90, Sep. 1981.
InfiniBand TM Architecture Specification vol. 1, Release 1.3, pp. 1-1842, Mar. 3, 2015.
Stevens., "TCP Slow Start, Congestion Avoidance, Fast Retransmit, and Fast Recovery Algorithms", Request for Comments 2001, pp. 1-6, Jan. 1997.
Netronome Systems, Inc., "Open vSwitch Offload and Acceleration with Agilio® CX SmartNICs", White Paper, pp. 1-7, Mar. 2017.
PCI Express® Base Specification ,Revision 3.0, pp. 1-860, Nov. 10, 2010.
Salowey et al., "AES Galois Counter Mode (GCM) Cipher Suites for TLS", Request for Comments: 5288, pp. 1-8, Aug. 2008.
Comer., "Packet Classification: A Faster, More General Alternative to Demultiplexing", The Internet Protocol Journal, vol. 15, No. 4, pp. 12-22, Dec. 2012.
Rescorla et al., "The Transport Layer Security (TLS) Protocol Version 1.3", Request for Comments: 8446, pp. 1-160, Aug. 2018.
Dierks et al., "The Transport Layer Security (TLS) Protocol Version 1.2", Request for Comments: 5246 , pp. 1-104, Aug. 2008.
Turner et al., "Prohibiting Secure Sockets Layer (SSL) Version 2.0", Request for Comments: 6176, pp. 1-4, Mar. 2011.
U.S. Appl. No. 16/159,767 Office Action dated Oct. 1, 2020.
European Application # 201668019 search report dated May 29, 2020.
Burstein, "Enabling Remote Persistent Memory", SNIA-PM Summit, pp. 1-24, Jan. 24, 2019.
Chung et al., "Serving DNNs in Real Time at Datacenter Scale with Project Brainwave", IEEE Micro Pre-Print, pp. 1-11, Mar. 22, 2018.
Talpey, "Remote Persistent Memory—With Nothing But Net", SNIA—Storage developer conference , pp. 1-30, year 2017.
Microsoft, "Project Brainwave", pp. 1-5, year 2019.
U.S. Appl. No. 16/202,132 office action dated Apr. 2, 2020.

* cited by examiner

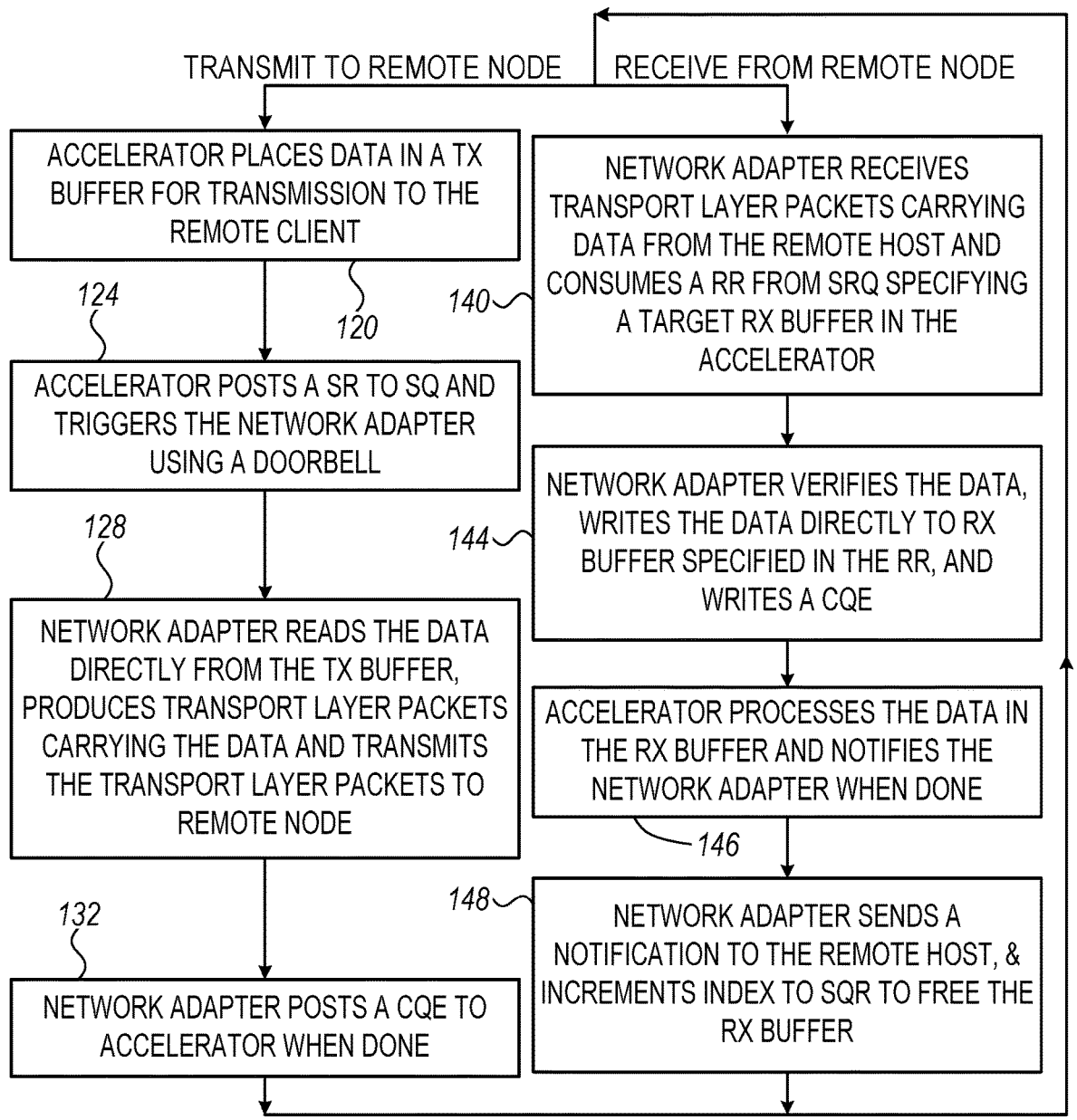

COMMUNICATION WITH ACCELERATOR VIA RDMA-BASED NETWORK ADAPTER

CROSS-REFERENCE TO RELATED APPLICATIONS

This application claims the benefit of U.S. Provisional Patent Application 62/827,223, filed Apr. 1, 2019, whose disclosure is incorporated herein by reference.

TECHNICAL FIELD

Embodiments described herein relate generally to computing and communication systems, and particularly to methods and systems for communication with an accelerator via a RDMA-based network adapter.

BACKGROUND

Computational accelerators are commonly used in off-loading computation-intensive tasks from a central processing unit (CPU, also referred to as the host processor) of a host computer. Such accelerators typically comprise hardware logic that is dedicated to particular types of operations, such as cryptography or data compression, and can thus perform these operations much faster than software-driven computation by the CPU.

Methods for performing computational tasks using accelerators are known in the art. For example, U.S. Patent Application Publication 2019/0163364 describes systems and methods for processing a non-volatile memory express over fabric (NVMe-oF) command at a Peripheral Component Interconnect Express (PCIe) attached accelerator device. Processing the NVMe-oF commands include receiving from a remote client, at a NVMe interface associated with the accelerator device, a Transport Control Protocol/Internet Protocol (TCP/IP)-encapsulated NVMe-oF command, and performing, at the accelerator device, functions associated with the NVMe-oF command that would otherwise be performed at a central processing unit (CPU).

U.S. Patent Application Publication 2019/0116127 describes a packet processing apparatus that includes a first interface coupled to a host processor and a second interface configured to transmit and receive data packets to and from a packet communication network. A memory holds context information with respect to one or more flows of the data packets conveyed between the host processor and the network in accordance with a reliable transport protocol and with respect to encoding, in accordance with a session-layer protocol, of data records that are conveyed in the payloads of the data packets in the one or more flows. Processing circuitry, coupled between the first and second interfaces, transmits and receives the data packets and includes acceleration logic, which encodes and decodes the data records in accordance with the session-layer protocol using the context information while updating the context information in accordance with the serial numbers and the data records of the transmitted data packets.

SUMMARY

An embodiment that is described herein provides a network node that includes a bus switching element, and a network adapter, an accelerator and a host, all coupled to communicate via the bus switching element. The network adapter is configured to communicate with remote nodes over a communication network. The host is configured to establish a RDMA link between the accelerator and a RDMA endpoint by creating a Queue Pair (QP) to be used by the accelerator for communication with the RDMA endpoint via the RDMA link. The accelerator is configured to exchange data, via the network adapter, between a memory of the accelerator and a memory of the RDMA endpoint.

In some embodiments, the RDMA endpoint includes a client process running locally on the host, and the RDMA link includes at least the local client process, the accelerator, the PCIe switch, and the network adapter. In other embodiments, the network adapter is configured to read the data directly from the memory of the accelerator, to apply to the read data transport layer processing for producing packets for transmission, in response to detecting that the packets are destined to the network adapter, to loop the packets back to the network adapter, to recover the data from the looped back packets, and to write the recovered data directly to the memory of the host. In yet other embodiments, the network adapter is configured to read the data directly from the memory of the host, to apply to the read data transport layer processing for producing packets for transmission, in response to detecting that the packets are destined to the network adapter, to loop the packets back to the network adapter, to recover the data from the looped back packets, and to write the recovered data directly to the memory of the accelerator.

In an embodiment, the RDMA endpoint is located on a remote node accessible over the communication network, and the RDMA link includes at least the accelerator, the PCIe switch, the network adapter, the communication network and the RDMA endpoint. In another embodiment, the network adapter is configured to receive from the remote node packets carrying the data, to apply to the received packets transport layer processing, to recover the data from the processed packets, and to write the recovered data directly to the memory of the accelerator. In yet another embodiments, the network adapter is configured to read the data directly from the memory of the accelerator, to apply to the read data transport layer processing for producing packets for transmission, in response to detecting that the produced packets are destined to the remote node, to transmit the produced packets to the remote node via the communication network.

In some embodiments, the RDMA endpoint includes a remote client process running on a remote network node, and the host is configured to create the queue pair in response to receiving from the remote client process a request to setup the RDMA link between the remote client and the accelerator. In other embodiments, the RDMA endpoint includes a remote accelerator residing in a remote network node, and the accelerator is configured to exchange the data between the memory of the accelerator and a memory of the remote accelerator, using RDMA communication. In yet other embodiments, the accelerator includes a shared receive buffer including multiple receive buffers, and the host is configured to create the queue pair by creating a send queue in the memory of the accelerator, creating a shared receive queue in the memory of the host and posting receive requests in the shared receive queue before sending messages over RDMA to the accelerator, each receive request posted is associated with a respective receive buffer in the shared buffer of the accelerator.

There is additionally provided, in accordance with an embodiment that is described herein, a method, including, in a network node that includes a network adapter, an accelerator and a host, all coupled to communicate via a Peripheral Components Interconnect Express (PCIe) switch, and the network adapter communicates with remote nodes over a communication network, establishing, by the host, a RDMA link between the accelerator and the RDMA endpoint by creating a Queue Pair (QP) to be used by the accelerator for communication with the RDMA endpoint via a RDMA link. Data is exchanged by the accelerator, via the network adapter, between a memory of the accelerator and a memory of the RDMA endpoint.

These and other embodiments will be more fully understood from the following detailed description of the embodiments thereof, taken together with the drawings in which:

BRIEF DESCRIPTION OF THE DRAWINGS

FIG. 3C is a flow chart that schematically illustrates a method for RDMA communication between an accelerator and a client on a remote host, in accordance with an embodiment that is described herein;

DETAILED DESCRIPTION OF EMBODIMENTS

Overview

Figure 1:
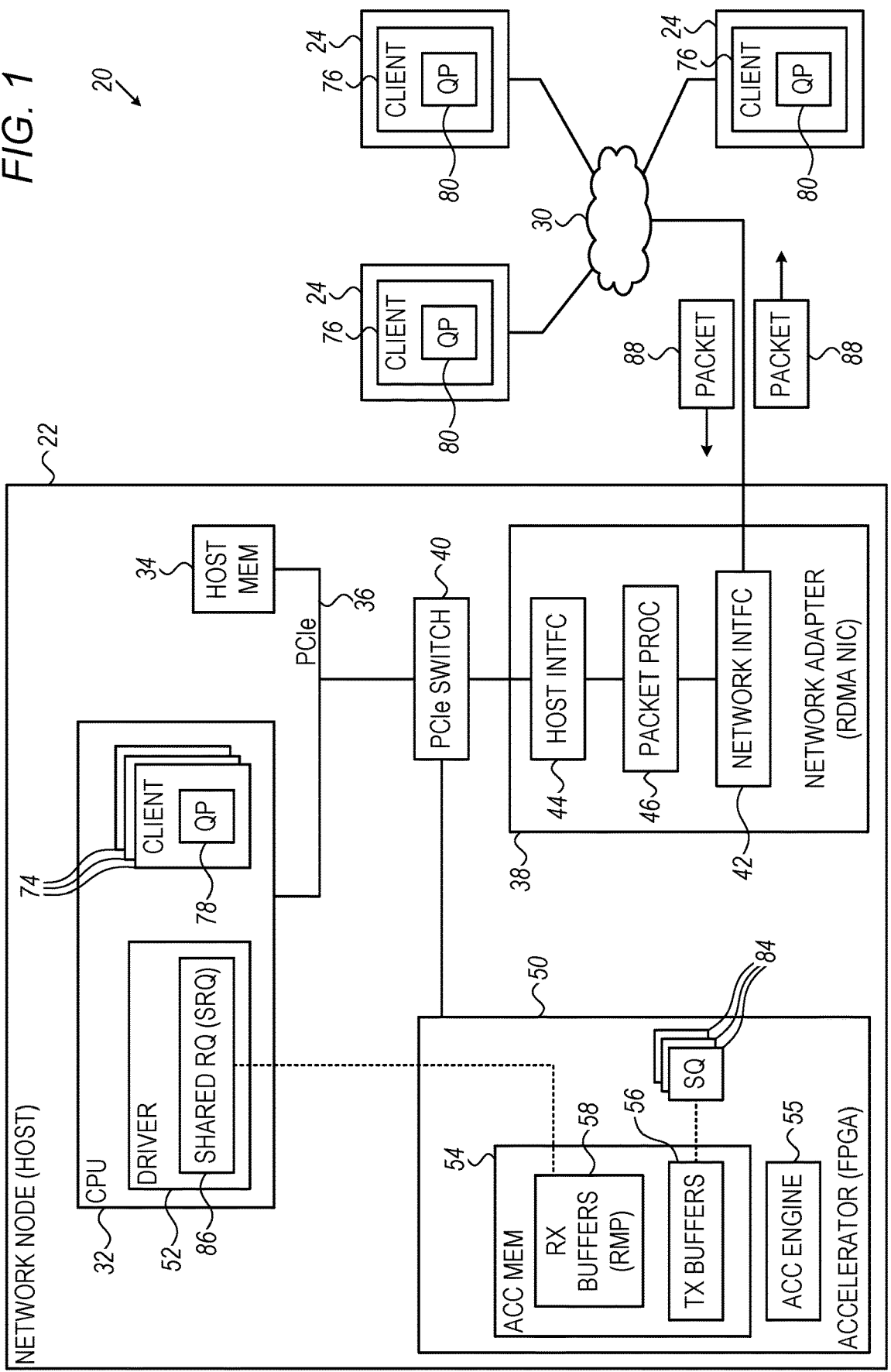
FIG. 1 is a block diagram that schematically illustrates a computing system that supports accelerated computations, in accordance with an embodiment that is described herein.

Embodiments that are described herein provide systems and methods for efficient and scalable RDMA-based communication between a computational accelerator and local or remote host.

In various cloud and other networking applications such as disaggregation and distributed heterogenous computation, an accelerator in one host computer provides acceleration services to a remote host computer over a communication network.

An accelerator typically comprises a dedicated coprocessor, computational logic or an integrated circuit, designed to perform certain computational operations efficiently, e.g., in hardware. For high performance acceleration, large amounts of data typically need to be transferred efficiently and with low latency to and from a memory of the accelerator. The accelerator may provide acceleration services to a local and/or remote host(s). As an example, an accelerator may be assigned to accelerate a job together with other accelerators, in the same communication network.

The accelerator is typically accessed by the local host via a suitable bus such as a PCIe bus. In principle, accessing the accelerator may be mediated via the memory of the local host. This, however, would require the host processor coupled to the bus to handle data transfer operations, thus reducing the amount of computational resources remaining for the host to handle other tasks. In another approach, a full RDMA engine could be implemented in the accelerator. Implementing full RDMA transport layer functionality within the accelerator, however, is typically impractical due to high costs and limited hardware resources in the accelerator.

Network adapters typically implement various service types and transport operations, including Remote Direct Memory Access (RDMA) operations. An element that communicates using a RDMA protocol is also referred to herein as "RDMA endpoint." A RDMA endpoint communicates with the transport layer of the communication network (e.g., an InfiniBand fabric or Ethernet) by manipulating a transport service instance, known as a Queue Pair (QP), made up of a send work queue (SQ) and a receive work queue (RQ). To send and receive messages over the communication network using a network adapter, a RDMA endpoint initiates work requests (WRs), which cause work items, called Work Queue Elements (WQEs), to be placed onto the appropriate work queues. In the present context and in the claims, a RDMA endpoint comprises an element that initiates WRs such as a client process running on a local or remote host, or any peripheral or coprocessor (e.g., an accelerator). The link established between two RDMA endpoints is also referred to herein as a "RDMA link."

A WQE typically has a data buffer (or buffers, e.g., in case of using a scatter gather list) associated with it, to be used for holding the data that is to be sent or received in executing the WQE. The network adapter executes the WQEs and thus communicates with the corresponding QP of the network adapter at the other end of the link.

A WQE corresponding to a Send Request (SR) specifies a source buffer containing a message to be transmitted. A WQE corresponding to a Read Request (RR) specifies a destination buffer for storing a received message. The completion of a given WR is typically indicated by placing a Completion Queue Entry (CQE) in an appropriate Completion Queue (CQ) accessible by the WR initiator. A CQE comprises a control message reporting the completion and outcome of executing a corresponding WR by the network adapter. For example, a CQE corresponding to a SR may report the locations to which data was scattered at the destination (an address in target memory), the size of the data transferred, a data verification result performed by the network adapter (e.g., CRC), timestamps and the like. A CQE may implicitly indicate that data buffered for sending is allowed to be overwritten, thus serving functionality of flow control.

In some disclosed embodiments, a network adapter such as a Network Interface Card (NIC) can accesses the accelerator memory and a host memory directly. Moreover, the network adapter implements RDMA transport layer functionality and applies Quality of Service (QoS) policies on behalf of the accelerator. The network adapter provides fast RDMA-based communication between the accelerator and client processes running on the local host or on remote hosts. RDMA communication between accelerators residing in different hosts is also supported. In the disclosed embodiments, messages that are exchanged between the accelerator and a remote node are not mediated via the host memory, which reduces the host bus bandwidth and the host memory bandwidth, and reduces communication overhead from the host.

The disclosed embodiments may be used, for example, for accessing remote accelerators, sharing accelerators among multiple users, and performing distributed computations in which multiple accelerators belonging to different host computers participate.

Consider a network node comprising a bus switching element (e.g., a PCIe switch), and further comprising a network adapter, an accelerator and a host, all coupled to communicate via the bus switching element. The network adapter is configured to communicate with remote nodes over a communication network. The accelerator is configured to exchange data, via the network adapter, between a memory of the accelerator and a memory of a RDMA endpoint. The host is configured to establish a RDMA link between the accelerator and the RDMA endpoint by creating a Queue Pair (QP) to be used by the accelerator for communication with the RDMA endpoint via the RDMA link.

In some embodiments, the RDMA endpoint comprises a client process running locally on the host, and the RDMA link comprises at least the local client process, the accelerator, the PCIe switch, and the network adapter. In these embodiments, the network adapter reads data directly from the memory of the accelerator (or from the memory of the host) and applies to the read data transport layer processing for producing packets for transmission. In response to detecting that the packets are destined to the same network adapter, the network adapter loops the packets back to itself, recovers the data from the looped back packets, and writes the recovered data directly to the memory of the host (or to the memory of the accelerator).

In some embodiments, the RDMA endpoint is located on a remote node accessible over the communication network, and the RDMA link comprises at least the accelerator, the PCIe switch, the network adapter, the communication network and the RDMA endpoint. In such embodiments, the network adapter receives from the remote node packets carrying data, applies to the received packets transport layer processing, recovers the data from the processed packets, and writes the recovered data directly to the memory of the accelerator. In the opposite direction, the network adapter reads data directly from the memory of the accelerator and applies to the read data transport layer processing for producing packets for transmission. In response to detecting that the produced packets are destined to the remote node, the network node transmits the produced packets to the remote node via the communication network.

In an embodiment, the RDMA endpoint comprises a remote client process running on a remote network node, and the host creates the queue pair in response to receiving from the remote client process a request to setup the RDMA link between the remote client and the accelerator. In another embodiment, the RDMA endpoint comprises a remote accelerator residing in the remote node, and the accelerator is configured to exchange data between the memory of the accelerator and a memory of the remote accelerator, using RDMA communication.

In some embodiments, the accelerator comprises a shared receive buffer comprising multiple receive buffers. In such embodiments, the host is configured to create the queue pair by creating a send queue in the memory of the accelerator, creating a shared receive queue in the memory of the host and posting receive requests in the shared receive queue before sending messages over RDMA to the accelerator. Each of the receive requests posted is associated with a respective receive buffer in the shared buffer of the accelerator. Using a shared buffer enables to reduce the memory footprint for receiving data in the accelerator and yet supporting large data bursts.

In the disclosed techniques the network adapter provides the accelerator with a message-based multi-channel interface for communicating with local and remote clients. The multi-channel interface requires only little hardware resources on the accelerator itself and is therefore highly scalable. The local and remote hosts are not confined to any specific software architecture. For example, Virtual Machine (VM), container, multi-process or any other suitable software architecture can be used.

By using the disclosed techniques, the overhead to the local host processor caused by handling communication with the local accelerator reduces, and therefore performance metrics such as memory bandwidth of the host memory and latency in communicating with the local accelerator improve significantly.

System Description

FIG. 1 is a block diagram that schematically illustrates a computing system 20 that supports accelerated computations, in accordance with an embodiment that is described herein.

In computing system 20, a host computer 22 (also referred to as a host or a network node) communicates with other hosts 24, via a communication network 30. Communication network 30 may comprise any suitable communication network operating in accordance with any suitable communication protocols, such as an InfiniBand™ (IB) switch fabric or an Ethernet network.

Host computer 22 comprises a processor, in the form of a central processing unit (CPU) 32, and a host memory (also referred to as a system memory), which are connected by a suitable bus 36. In the present example bus 36 comprises a Peripheral Component Interconnect Express (PCIe) bus. Host computer 22 comprises a network adapter 38, such as an IB Host Channel Adapter (HCA) or a Network Interface Card (NIC), which is coupled to bus 36 via any suitable switching element 40. In the present example, switching element 40 comprises a PCIe switch. In the description that follows it is assumed that network adapter 38 implements RDMA functionality, such as a "RDMA NIC."

Network adapter 38 comprises a network interface 42, which is coupled to communication network 30, and a host interface 44, which connects via PCIe switch 40 and bus 36 to CPU 32 and host memory 34. Packet processing circuitry 46, coupled between network interface 42 and host interface 44, generates outgoing packets for transmission over communication network 30 and processes incoming packets received from the communication network, as will be described below. Among other tasks, packet processing circuitry 46 handles transport layer packet processing. Network interface 42, host interface 44 and packet processing circuitry 46 typically comprise dedicated hardware logic. Alternatively or additionally, at least some of the functions of packet processing circuitry 46 may be implemented in software on a suitable programmable processor.

Host computer 22 comprises a computational accelerator 50, coupled to PCIe switch 40. Computational accelerator 50 is also referred to as "accelerator" for brevity. Each of CPU 32 and network adapter 38 has access to accelerator 50 via PCIe switch 40. Consequently, accelerator 50 may provide accelerated computation services to local CPU 32, a remote host computer 24 via communication network 30, or both.

In some embodiments, accelerator 50 and network adapter 38 are implemented on the same board. This, however, is not mandatory. In alternative embodiments, accelerator 50 and network adapter are implemented on separate boards that are inserted into different PCIe slots of host computer 22.

Accelerator 50 comprises an accelerator memory 54 and an acceleration engine 55. In accelerator memory 54, one or more transmission (TX) buffers 56 and one or more reception (RX) buffers 58 are respectively used for storing data pending transmission to and data received from the local or a remote host. Accelerator 50 is configured to apply a predefined computational operation or function to data, e.g., in a RX buffer 58, which produces data result, e.g., in a TX buffer 56. Accelerator 50 may support one or more pre-defined computational operations such as, for example, cryptographic operations, data compression and decompression, mathematical and logical operations, or any other suitable operation.

Client processes 74, (also referred to simply as "clients" for brevity) running on CPU 32, such as processes generated by application software, communicate with clients 76 running on remote hosts 24 by means of QPs 78 on network adapter 38. In some embodiments, each client 74 may be assigned multiple QPs 78, which are used to communicate with different clients on various remote hosts 24, using QPs 80. In communicating using a given QP 78, a client 74 to which that QP is assigned, posts WQEs to both the send queue and the receive queue of the QP.

In the disclosed embodiments, accelerator 50 communicates with local clients 74, with remote clients 76 or both, using QP-based communication. To this end, accelerator 50 uses a dedicated QP for communicating with each respective client 74 or 76. In some embodiments, each of the QPs that are assigned to accelerator 50 is split between accelerator 50 and CPU 32. In the present example, the send queue parts (SQs 84) of such QPs reside in the accelerator, and the receive queue parts of these QPs, however, are implemented in a Shared Receive Queue (SRQ) 86 in host 22. Accelerator 50 consumes send requests (SRs) from SQs 84 to send data from TX buffers 56 and consumes receive requests (RRs) from SRQ 86 for receiving data into RX buffers 58.

A driver program 52, running on CPU 32, manages the communication operations of clients 74 and accelerator 50 via network adapter 38. For example, driver 52 allocates buffers for sending and receiving data carried, e.g., by packets 88 to and from remote clients 76 on peer devices (hosts 24) using any of the participating QPs on host 22 and hosts 24.

In some embodiments, SRQ 86 comprises a cyclic queue. In such embodiments, driver 52 posts WQEs in the form of receive requests (RRs) to SRQ 86 before communication starts. Each receive request in the SRQ is associated with a respective RX buffer 58. In some embodiments, RX buffers 58 are divided into strides of a certain, uniform size, which may be set by driver 52. In an embodiment, driver 52 posts the RRs to SRQ 86 once, e.g., at initialization, and the network adapter automatically re-posts consumed WQEs.

Schemes for RDNA Communication with Accelerator

Figure 2A:
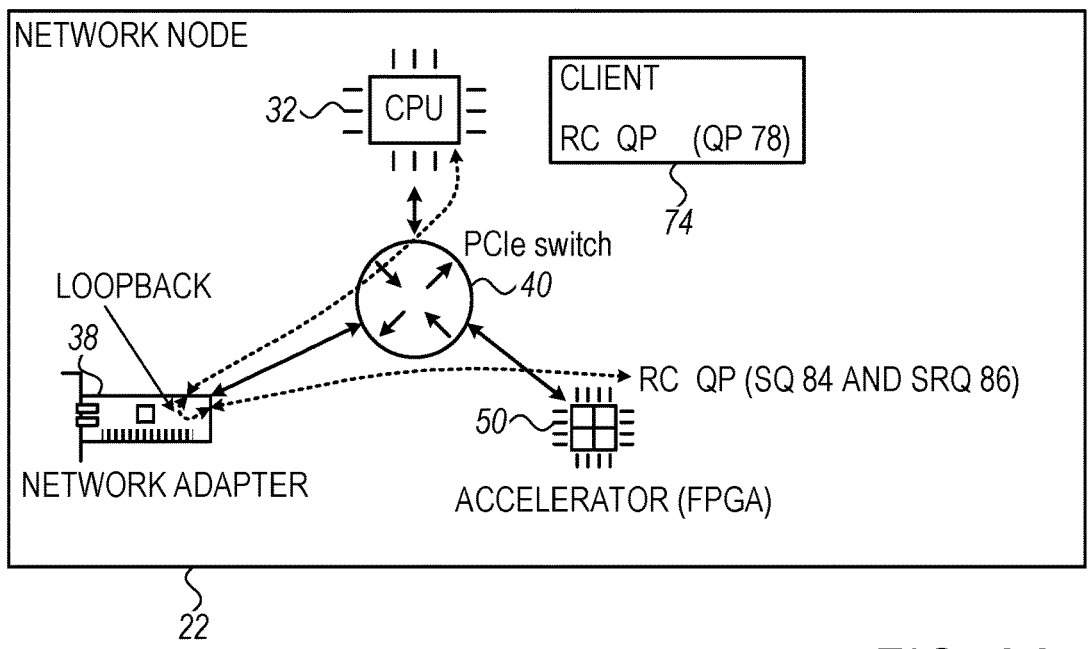
FIGS. 2A-2C are diagrams that schematically illustrate schemes for RDMA-based communication with an accelerator, in accordance with embodiments that are described herein.
Figure 2B:
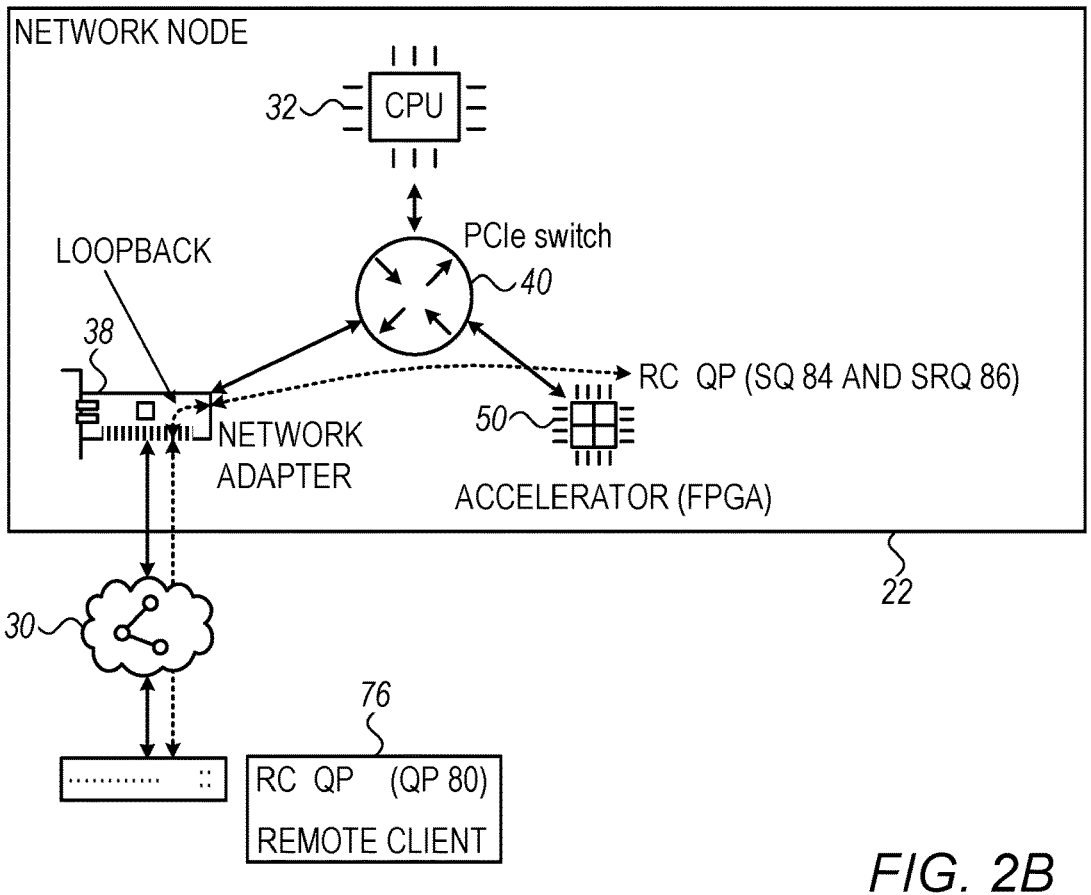
Figure 2C:
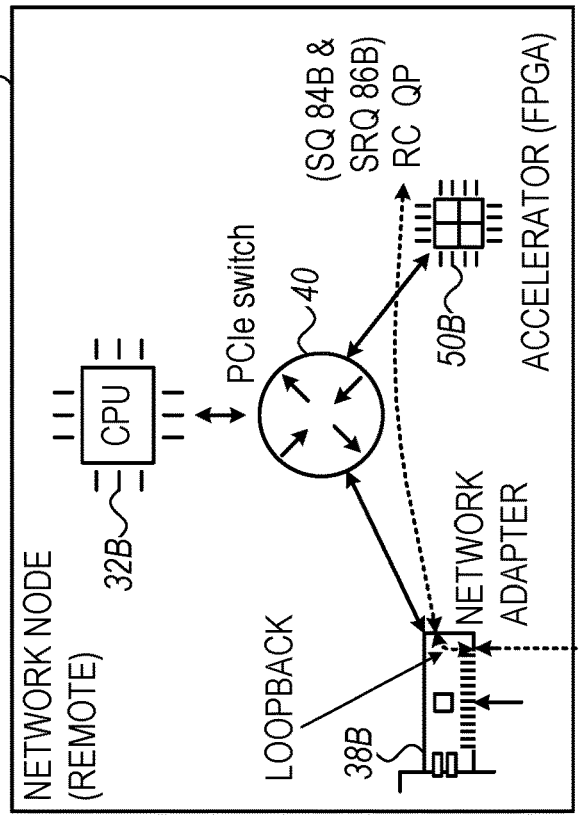
Figure 2C:
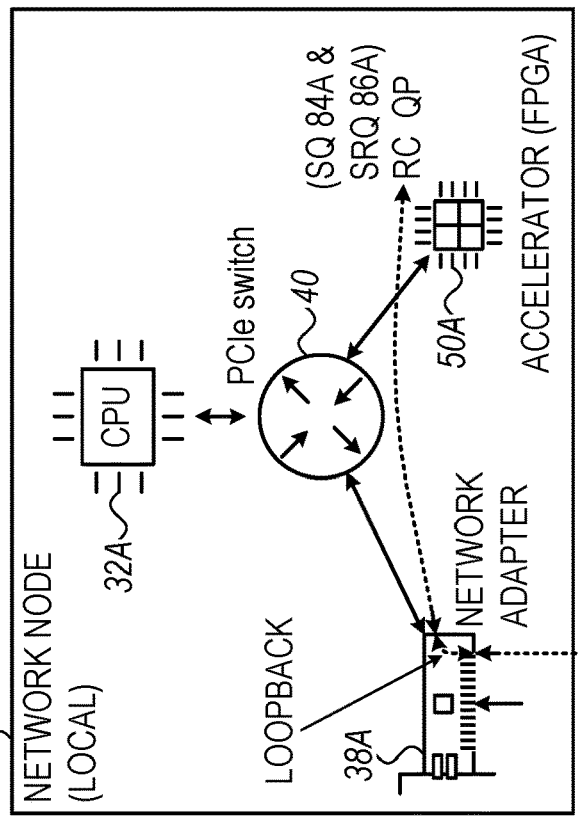

FIGS. 2A-2C are diagrams that schematically illustrate schemes for RDMA-based communication with an accelerator, in accordance with embodiments that are described herein.

FIG. 2A depicts a scheme, according to which a client 74 communicates with local accelerator 50 of host 22 via network adapter 38. In an embodiment, driver 52 establishes a Reliable Connection (RC) transport between client 74 and accelerator 50, by creating a RC QP 78 to be used by network adapter 38 at the client side, and another RC QP split between a SQ 84 and SRQ 86 (as described above) to be used by accelerator 50. Driver 52 (of FIG. 1) configures a loopback (using loopback logic—not shown) between a QP (SQ 84 and SRQ 86) used for communication between the network adapter and the accelerator, and a QP (78) used for communication between the network adapter and the local client. The loopback logic is owned by driver 52.

In some embodiments, a loopback between an accelerator QP and a local client QP (or a QP used for communication with a remote network node) is implemented by performing a send WQE from the accelerator QP and a receive WQE from the other QP, or performing a receive WQE from the accelerator QP and a send WQE from the other QP.

In sending data (e.g., a message) from a client 74 to accelerator 50, network adapter 38 reads data directly from a buffer in host memory 34, via PCIe switch 40, using Direct Memory Access (DMA) methods. The network adapter packetizes the read data into packets for transmission and redirects the packets back to the network adapter. Network adapter 38 recovers the data from the redirected packets and writes the recovered data directly to a destination RX buffer 58 in accelerator 50 via PCIe switch 40, using DMA methods.

In sending data (e.g., a message) from accelerator 50 to a client 74, network adapter 38 reads data from a TX buffer 56 of the accelerator via PCIe switch 40 using DMA, packetizes the data for transmission and redirects the packets back to the network adapter. The network adapter recovers the data from the redirected packets and writes the recovered data to a specified buffer in host memory 34 via PCIe switch 40.

In FIG. 2B, remote client 76 of remote host 24 communicates with accelerator 50 of host 22 via communication network 30 and network adapter 38. Driver 52 establishes a reliable connection between client 76 and accelerator 50, by creating a RC QP split between a SQ 84 and SRQ 86 (as described above) to be used by accelerator 50. It is further assumed that client 76 on remote host 24 creates a RC QP 80 to be used by a network adapter at the remote client side. Driver 52 configures a loopback between a QP (SQ 84 and SRQ 86) used for communication between the network adapter and the accelerator, and a QP used for communication with the remote network node using a QO 80.

In sending data from remote client 76 to local accelerator 50, network adapter 38 receives packets carrying data that were sent by the remote client over communication network 30. Network adapter 38 recovers the data from the received packets and writes the data directly to a specified RX buffer 58 in accelerator 50 via PCIe switch 40, using DMA.

In sending data from accelerator 50 to remote client 76, network adapter 38 reads data directly from a TX buffer 56 via PCIe switch 40 using DMA. The network adapter packetizes the data and transmits the packets to communication network 30. A network adapter at the remote host side receives the packets, recovers the data carried in these packets and writes the recovered data to a specified buffer in a memory of the remote host.

In FIG. 2C accelerator 50A of host 22 communicates using RDMA with accelerator 50B of remote host 24 via communication network 30 and network adapters 38A and 38B. Drivers 52 of hosts 22 and 24 establish a reliable connection between accelerators 50A and 50B, by creating respective RC QPs, split between SQ 84A and SRQ 86A to be used by accelerator 50A and split between SQ 84B and SRQ 86B to be used by accelerator 50B. Driver 52 in the local node configures a loopback between a QP (SQ 84A and SRQ 86A) used for communication between the network adapter and the accelerator, and a QP used for communication between the network adapter and the remote network node using a QP 80. It is assumed that a similar loopback is also configured at the remote node.

In sending data (a message), e.g., from accelerator 50B to accelerator 50A, network adapter 38B reads data from a TX buffer 56 of accelerator 50B using DMA, packetizes the data into packets and transmits the packets to communication network 30. Network adapter 38A receives the packets sent by the remote host over communication network 30, recovers the data from the packets and writes the recovered data to a specified RX buffer 58 in accelerator 50A via PCIe switch 40, using DMA.

The schemes in FIG. 2A-2C above may be combined to create more complex configurations. For example, a first host may be connected via communication network 30 to second and third other hosts that each comprises a local accelerator (such as host 22). The first host can communicate using RDMA with the accelerator of the second and with the accelerator of the third host, e.g., as described in FIG. 2B. Moreover, the accelerators of the second and third hosts can exchange messages with one another using RDMA-based communication as described in FIG. 2C. In some embodiments, using the above configuration, the first host can perform a chained accelerated operation efficiently. For example, the accelerator of the second host performs accelerated operation to data received from the first host to produce first result, and the accelerator of the third host performs an accelerated operation to the first result, sent by the second host, to produce a second result. The second host sends the second result to the first host. Note that the first host need not read the intermediate first result.

Implementation Considerations

In some embodiments, network adapter 38 implements transport layer functionality on behalf of accelerator 50. Such transport layer functionality comprises, for example, packetizing data into transport layer packets for transmission, and recovering data carried in transport layer packets received from communication network 30.

Other transport layer tasks performed by network adapter 38 comprise handling reliable communication using packet ordering, sending acknowledgment messages notifying packets that were received successfully and retransmission of lost packets, verification of data received, e.g., using a Cyclic Redundancy Check (CRC) of a message content, managing flow control. Address translation, e.g., between addresses in the PCIe address space and the accelerator address space is typically performed as part of DMA operations.

In some embodiments, the PCIe link between accelerator 50 and network adapter 38 via PCIe switch 40 is configured to operate in a peer-to-peer (P2P) mode. This configuration allows efficient and fast transfer of data and control messages between accelerator 50 and network adapter 38 via PCIe switch 40. Control messages comprise, for example, messages used for triggering Send and other RDMA operations, and messages used for notifying completion of WRs. Management operations such as, creation and teardown of various resources such as QPs, SRQ and CQ are carried out in software, e.g., by driver 52.

In some embodiments, network adapter 38 handles Quality of Service (QoS) functionality. In an embodiment, driver 52 sets selected QoS policies specifying QoS-related parameters such as bandwidth budget, priorities among clients, bandwidth limitations and the like. Network adapter 38 enforces the QoS policies so that clients using accelerator 50 get respective portions of the available bandwidth budget in accordance with the QoS policies set by driver 52.

In some embodiments, network adapter 38 may enforce a QoS policy by assigning (i) a maximum burst size for each client in each round, (ii) the round length and (iii) the number of slots that each client has in each round.

In some embodiments, network adapter 38 manages the runtime sharing of accelerator 50 resources and arbitrating among clients. Consider for example, two clients configured to share together a 10% portion of the total accelerator bandwidth budget. Assuming an even sharing scheme, when both clients send data to the accelerator, each client gets 5% of the accelerator bandwidth budget. When one of the clients, however, reduces its workload towards the accelerator, the other client may send data to the accelerator up to the 10% bandwidth budget.

Communication with accelerator 50 may be carried out in various ways. In some embodiments, RX buffers 58 in accelerator 50 that are exposed to the PCIe bus are managed as a single striding Receive Memory Pool (RMP). Driver 52 initializes a SRQ 86 (in host 22) and posts RRs to this SRQ, wherein each such RR points to a respective RX buffer 58. Aspects of implementing a striding shared buffer are described, for example, in a U.S. patent Ser. No. 10/210,125.

In an embodiment, accelerator 50 monitors memory utilization for each RR in the SRQ and notifies network adapter 38 when a used RX buffer 58 becomes available for receiving a subsequent message.

In an embodiment, accelerator 50 comprises a single Receive Completion Queue (RCQ). The network adapter notifies accelerator 50 that a received message has been written to a RX buffer 58 by writing a Completion Queue Entry (CQE) to this RCQ. The CQE specifies to which receive queue the message has been written. Note that accelerator 50 is triggered by the CQE and does not need to assemble PCIe transactions into a message, nor to verify the message content (e.g., based on a CRC of the message). Note that unlike conventional RDMA in which the host CPU receives a CQE by polling the completion queue, accelerator 50 receives a PCIe Transaction Layer Packet (TLP) containing the CQE, which triggers the operation with no further read or polling operation.

In some embodiments, for each client to which accelerator 50 sends messages, the accelerator has respective resources—a TX buffer 56, a SQ 84 and a CQ. In some embodiments, to trigger transmission from a TX buffer to a given client, accelerator 50 posts a SR to the relevant SQ and writes a doorbell directly to network adapter 38 via PCIe switch 40 in a peer-to-peer mode. The doorbell signals the network adapter to read a SR from the SRQ. In alternative embodiments, multiple TX buffers 56 of accelerator 50 may be shared among multiple clients.

In some embodiments, accelerator 50 remaps addresses of accelerator memory 54 to be accessed by network adapter 38. This allows exposing to the network adapter multiple message fragments as a contiguous range of memory addresses, which reduces communication overhead over PCIe. Specifically, in sending a fragmented message to the accelerator, the network adapter hides this from the accelerator by writing the fragmented message into the accelerator memory. In sending a fragmented message from the accelerator, the network adapter hides this from both the accelerator and the host.

In some situations, accelerator 50 may fail to process data received from the communication network sufficiently fast or may become blocked during transmission due to backpressure from the communication network. Limiting the transmission rate at the remote client side to prevent such occurrences may be carried out using flow control techniques. In an embodiment, the transport layer processing (e.g., as part of packet processing circuitry 46) in network adapter 38 may apply flow control methods. For example, when the network adapter receives more data than it can handle in its pipeline, the network adapter may apply flow control by propagating backpressure to receive queues of the network adapter. This, however, can cause a head-of-line blocking among the accelerator channels sharing multiple RX buffers 58 because the bottleneck originates from the neck and blocks all the data before the data is split into the accelerator queues. Alternatively, flow control may be handled by host 22 at an application-layer level. In this embodiment, accelerator 50 exposes to the remote host (24) credits indicating the number of messages that the remote host is permitted to send to accelerator 50. Credit counts may be updated e.g., explicitly by exchanging application-layer messages between the local and remote hosts, or implicitly by responding to remote requests. For example, accelerator 50 may send a message to a client indicating that the accelerator is ready for receiving data from that client.

Software elements in network node 22 may be configured in various way. In some embodiments, the host runs a kernel driver that exposes the resources of accelerator 50 to the user-space and enables network adapter 38 to access accelerator 50 using the PCIe peer-to-peer mode. In some embodiments, a daemon program in the user-space initiates the resources of the network adapter and accelerator and allows clients to establish connections. Note that some of the resources, e.g., SRQ 86 are global and therefore need to be created and initialized once after every reset event. Other resources such as QPs are allocated when a client establishes communication with the accelerator.

Methods for RDMA Communication Between Accelerator and Remote Host

Figure 3A:
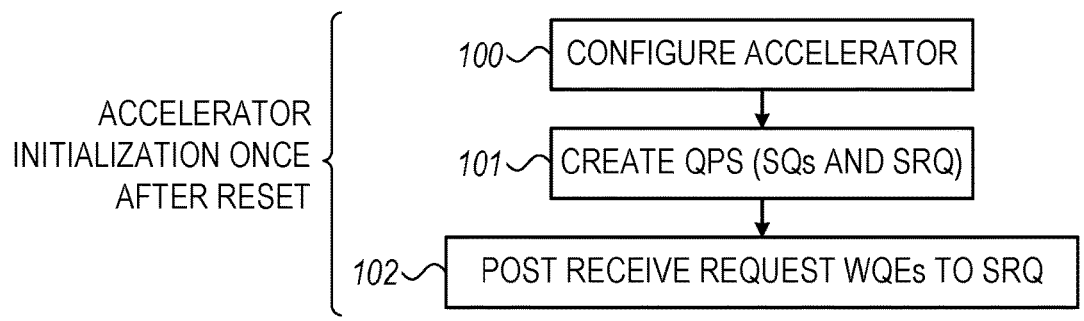
FIG. 3A is a flow chart that schematically illustrates a method for initializing an accelerator for RDMA-based communication, in accordance with an embodiment that is described herein.

FIG. 3A is a flow chart that schematically illustrates a method for initializing an accelerator for RDMA-based communication, in accordance with an embodiment that is described herein. The method is typically executed once in response to a reset or powerup event.

The method begins at an acceleration configuration step 100, at which driver 52 configures accelerator 50. The configuration may comprise, for example, a name (address, ID) of the accelerator, accelerator capabilities, number of queues used, a QP number for each acceleration function, SRQ parameters, and the like. At a QP creation step 101, driver 52 creates QPs to be used for communication by accelerator 50. Specifically, driver 52 creates a SQs 84 within accelerator 50 and SRQ 86 within the host. SQs 84 and SRQ 86 will be used for sending data to and receiving data from local clients 74 and remote clients 76. At a WQEs posting step 102, driver 52 posts RR WQEs to SRQ 86. Accelerator 50 will later receive data by network adapter 38 executing the RR WQEs in the SRQ sequentially and cyclically. Following step 102 the method terminates.

Figure 3B:
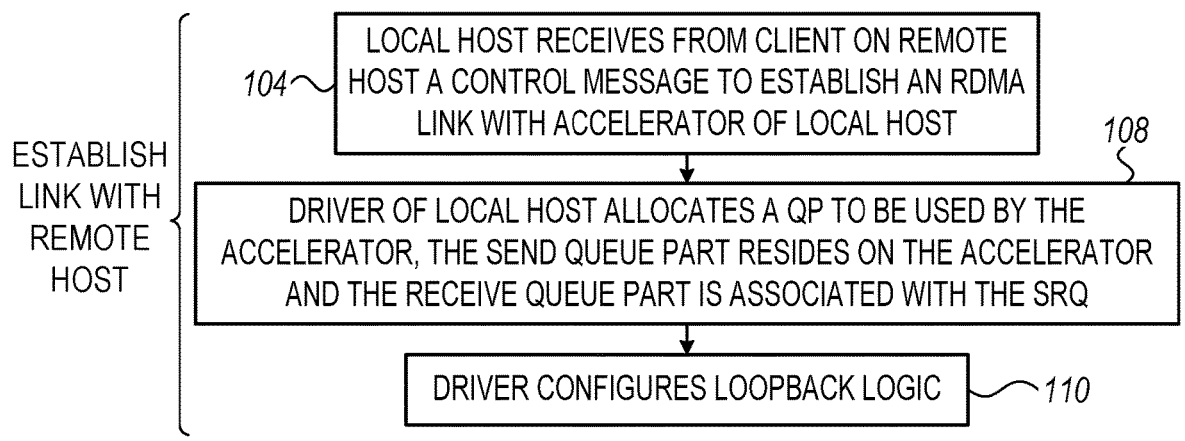
FIG. 3B is a flow chart that schematically illustrates a method for link establishment between accelerator and a remote node, in accordance with an embodiment that is described herein.

FIG. 3B is a flow chart that schematically illustrates a method for link establishment between accelerator and a remote network node, in accordance with an embodiment that is described herein.

The method begins at a channel establishment step 104, at which local host 22 receives from a remote client 76 a control message to establish a RDMA link between accelerator 50 and the remote client. At a link establishment step 108, driver 52 of local host 22 allocates a QP to be used by accelerator 50. The SQ part of this QP resides on the accelerator and the RQ part is associated with SRQ 86 that was initialized at step 100. It is assumed that the remote host allocates a corresponding QP to be used by the network adapter at the remote host side.

At a loopback configuration step 110, driver 52 configures loopback logic in network adapter 22. The loopback associates between a local QP used for communication between the network adapter and the accelerator, and another QP used for communication with a local client or with a remote network node. Following step 110, the method terminates.

FIG. 3C is a flow chart that schematically illustrates a method for RDMA communication between an accelerator and a client on a remote host, in accordance with an embodiment that is described herein.

The method will be described with reference to remote host 24 communicating with accelerator 50 of local host 22 in FIG. 1. It is assumed, that the method of FIG. 3C is executed after execution of the method of FIG. 3B, which means that accelerator 50 and the remote client are ready to communicate with one another.

The method splits into transmission and reception branches, which are typically executed in parallel.

In the transmission branch, the method begins at a preparation for transmission step 120, with accelerator 50 placing data (e.g., a message) for transmission in a TX buffer 56. At a WQE assembly step 124, accelerator 50 assembles a SR that specifies transmission of the data placed in the TX buffer to the remote host. Note that the operation of assembling the SR at step 124 is much less complex than conventional assembling of a general RDMA WQE, because most of the SR information may be extracted from the data. The QP identifier may be extracted from a channel ID associated with the SR. Further at step 124, the accelerator triggers network adapter 38 on local host 22 to consume the posted SR by writing a suitable control message to a doorbell on the network adapter via PCIe switch 40. Doorbells in network adapter 38 may be implemented, for example, using registers, or any other suitable type of writable storage.

At a transmission step 128, in response to the doorbell, network adapter 38 consumes the SR posted at step 124 and executes the SR by reading the data to be transmitted directly from Tx buffer using DMA methods. Network adapter 38 produces transport layer packets carrying the data and transmits the transport layer packets to remote host 24 over communication network 30. At a completion step 132, network adapter 38 posts a CQE to accelerator 50, when the entire data (message) has been sent. The CQE indicates to accelerator 50 that the TX buffer recently used is now available for reuse.

In the reception method branch, the method begins at a packet reception step 140, with network adapter 38 of local host 22 receiving transport layer packets from remote host 24, over communication network 30 and consumes a RR from the SRQ specifying a target RX buffer in the accelerator for data carried in the received transport layer packets.

At a data recovery step 144, network adapter 38 of local host 22 recovers the data from the transport layer packets, writes the recovered data directly (using DMA methods) to the RX buffer specified in the RR consumed at step 140, and writes a CQE to accelerator 50 when all the data has been written successfully.

At an acceleration step 146, accelerator 50 processes the data in the Rx buffer (by applying a specified function to the data) and notifies the network adapter when done. At a processing-completion step 148, network adapter 38 sends a processing-completion notification to remote host 24 over communication network 30.

Following each of steps 132 and 148, the method loops back to steps 120 and 140 to perform further data transfer operations between accelerator 50 and remote host 24.

Although the method of FIG. 3C refers to a client on a remote host, the accelerator need not be aware of whether the target client resides on remote host 24 and is accessible over communication network 30, or the client runs on local host 22 and is accessible via PCIe switch 40.

In the method of FIG. 3C, driver 52 establishes a RDMA link between accelerator 50 and a remote client 76. Note that in embodiments in which the accelerator provides acceleration services to a local client, driver 52 similarly establishes a RDMA link between accelerator 50 and local client 74.

RDMA-Based Communication Between Host and Local Accelerator

Figure 4:
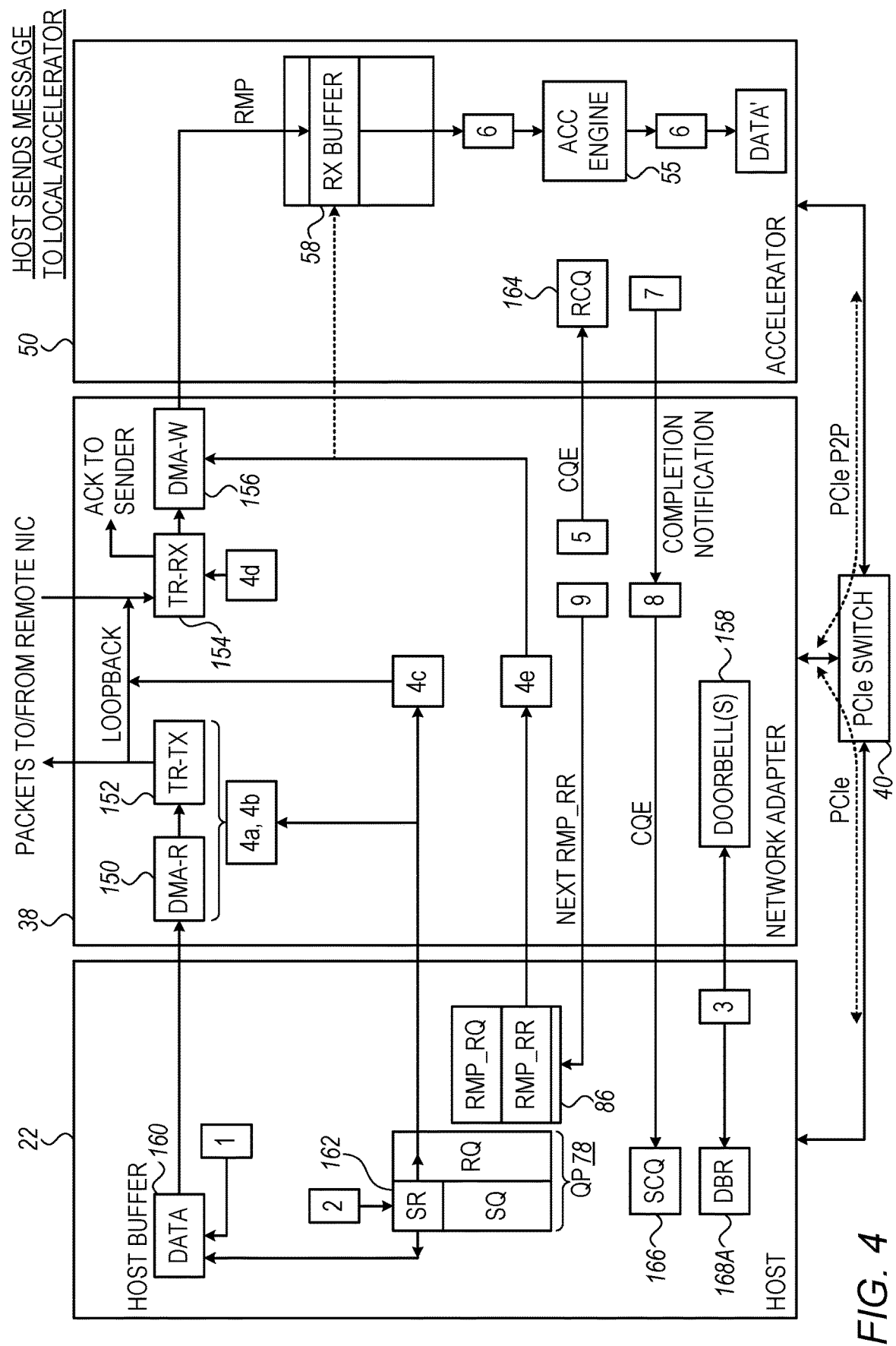
FIGS. 4 and 5 are diagrams that schematically illustrate elements and operations involved in RDMA communication between host and local accelerator via a network adapter, in accordance with embodiments that are described herein.
Figure 5:
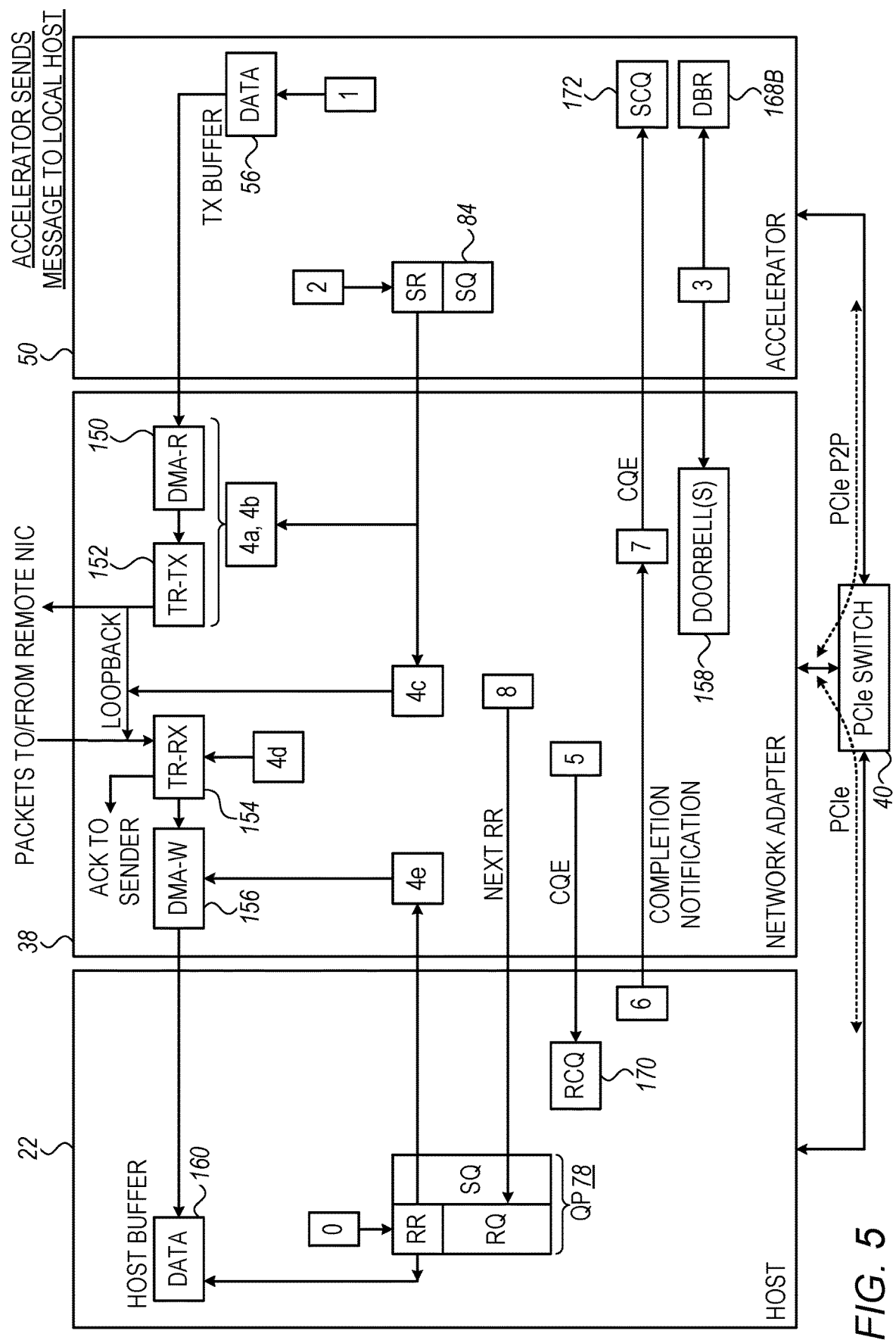

FIGS. 4 and 5 are diagrams that schematically illustrate elements and operations involved in RDMA communication between host 22 and local accelerator 50 via network adapter 38, in accordance with embodiments that are described herein.

Each of FIGS. 4 and 5 depicts host 22, network adapter and accelerator 50, all coupled via PCIe switch 40. Network adapter 38 and accelerator 50 communicate with one another in PCIe peer-to-peer mode.

In FIGS. 4 and 5, network adapter 38 comprises a DMA read module 150 (denoted DMA-R) for reading a message directly from a host buffer 160. DMA-R 150 delivers data read from host buffer 160 to a transport layer transmitter 152 (denoted TR-TX). Network adapter 38 further comprises a transport layer receiver 154 (denoted TR-RX) coupled to a DMA write module 156 (denoted DMA-W) having direct access to a RX buffer 58 in accelerator 50. Network adapter 38 further comprises one or more doorbells 158. In some embodiments, TR-TX 152 and TR-RX 156 are part of packet processing circuitry 46, and DMA-R 150 and DMA-W 156 are part of host interface 44.

In FIG. 4, a client 74 (not shown) on host 22 sends a message to local accelerator 50. A sequence of numbered operations involved in this transaction are described herein. It is assumed that driver 52 has configured a loopback between RMP RQ 86 and QP 78.

1. A client (74) running on host 22 writes a message denoted DATA, in a host buffer 160 of host 22. The message is destined to local accelerator 50.
2. The client posts a WQE in the form of a SR 162 pointing to host buffer 160, in a SQ of a QP 78 assigned to that client.
3. The client writes a doorbell 158 to network adapter 38 and saves a doorbell record (denoted DBR 168A) for recovering the doorbell in case the doorbell is dropped.
4. In response to doorbell 158, network adapter 38 performs the following operations:
   a. Network adapter 38 consumes SR 162, and based on the SR content configures DMA-R 150 to read data (message DATA) directly from host buffer 160. DMA-R 150 forwards the read data to TR-TX 152.
   b. TR-TX 152 packetizes the data in transport layer packets and transmits the transport layer packets.
   c. Network adapter 38 detects (based on the SR, or on addressing information in headers of the transport layer packets) that the transport layer packets are destined to the same network adapter that sent them and uses loops the packets back to TR-RX 154.
   d. TR-RX 154 processes the transport layer packets to verify the data carried by these packets. TR-RX 154 transmits an ACK notification (e.g., per packet) back to the sender (client 74 on host 22 in this case).
   e. DMA-W 156 reads the current read request (denoted RMP RR) from SRQ 86 (also denoted RMP-RQ) to get a pointer to a relevant RX buffer 58 and writes the payload of the received packets to RX buffer 58 on accelerator 50. Note that read RRs may be cached until being served.
5. Network adapter 38 writes a CQE to RCQ 164 in accelerator 50. The CQE indicates to the accelerator that the message has been written successfully to RX buffer 58.
6. In response to the CQE, accelerator 50 performs a specified accelerated operation to the data in the RX buffer, e.g., using accelerator engine 55. The processed data output by the accelerator is denoted DATA'. When the accelerator supports multiple functions, the actual function to be used may be selected in various ways. In one embodiment, each of the supported functions is designated a dedicated QP. In another embodiment, a packet carries meta data that selects the required function.
7. Accelerator 50 writes a processing-completion notification to network adapter 38 after completing the acceleration operation.
8. In response to the completion notification, network adapter 38 writes a CQE to a SCQ 166 in host 22.
9. Network adapter 38 frees recently used RX buffer 58, e.g., by incrementing (cyclically) a consumption index in SRQ 86 to the next RMP_RR.

In FIG. 5, accelerator 50 sends a message to client on local host 22. A sequence of numbered operations involved in this transaction are described herein. It is assumed that driver 52 has configured a loopback between SQ 84 and QP 78.

0. Host 22 posts a RR in the RQ of a QP 78, the RR points to a host buffer 160 in which the received data will be placed.
1. Accelerator 50 writes a message denoted DATA to a TX buffer 56 of the accelerator. The message is destined to a client 74 on local host 22.
2. Accelerator 50 posts a WQE in the form of a SR pointing to TX buffer 56, in a SQ 84 assigned to communication with that client.
3. Accelerator 50 writes a doorbell 158 to network adapter 38 and saves a doorbell record (denoted DBR 168B) for recovering the doorbell in case the doorbell is dropped.
4. In response to doorbell 158, network adapter 38 performs the following:
   a. Network adapter 38 consumes the SR from SQ 84 and based on the SR content configures DMA-R 150 to read data (message DATA) directly from TX buffer 56. DMA-R 150 forwards the read data to TR-TX 152.
   b. TR-TX 152 packetizes the data in transport layer packets and transmits the transport layer packets.

c. Network adapter 38 detects (based on the SR, or on addressing information in headers of the transport layer packets) that the transport layer packets are destined to the same network adapter loops the packets back to TR-RX 154.

d. TR-RX 154 processes the transport layer packets to verify the data carried in these packets. TR-RX 154 transmits an ACK notification back to a transport module (not shown) in the sender (accelerator 50 in this case). The transport module sends a CQE to the sender (accelerator 50) in response to the ACK.

e. DMA-W 156 reads the current RR to get a pointer to the target host buffer (160) and writes the payload of the received packets to host buffer 160 on host 22.

5. Network adapter 38 writes a CQE to RCQ 170 in host 22. The CQE indicates to the client that the message has been written successfully to the host buffer.

6. Host 22 writes a completion notification to network adapter 38.

7. In response to the completion notification, network adapter 38 writes a CQE to a SCQ 172 in the accelerator. The CQE indicates to accelerator 50 that TX buffer 56 is available for reuse.

8. Network adapter 38 posts another RR to RQ of QP 78 to receive another message for the client.

RDMA-Based Communication Between Remote Host and Accelerator

Figure 6:
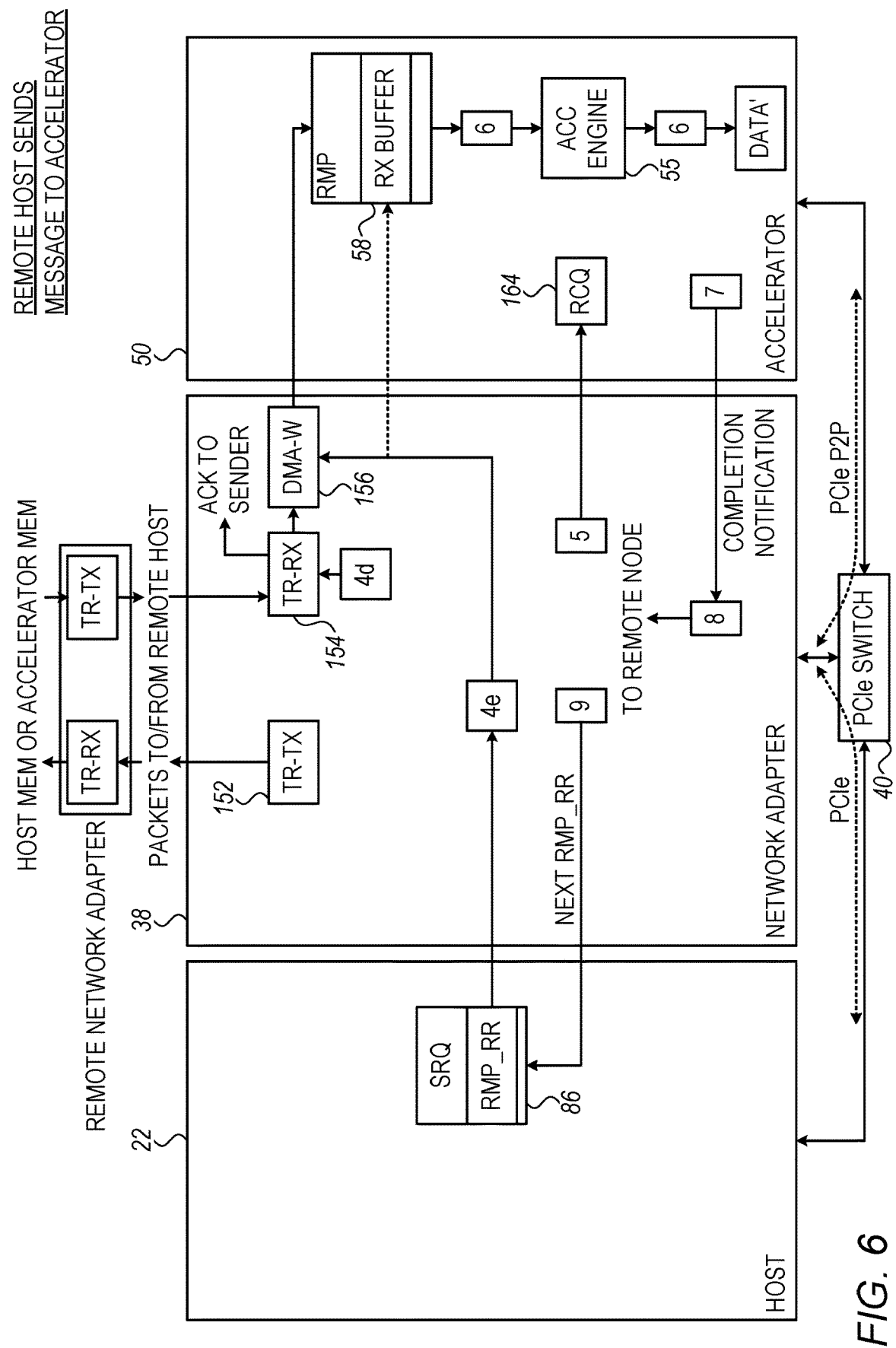
FIGS. 6 and 7 are diagrams that schematically illustrate elements and operations involved in RDMA communication between remote host and local accelerator via a network adapter, in accordance with embodiments that are described herein.
Figure 7:
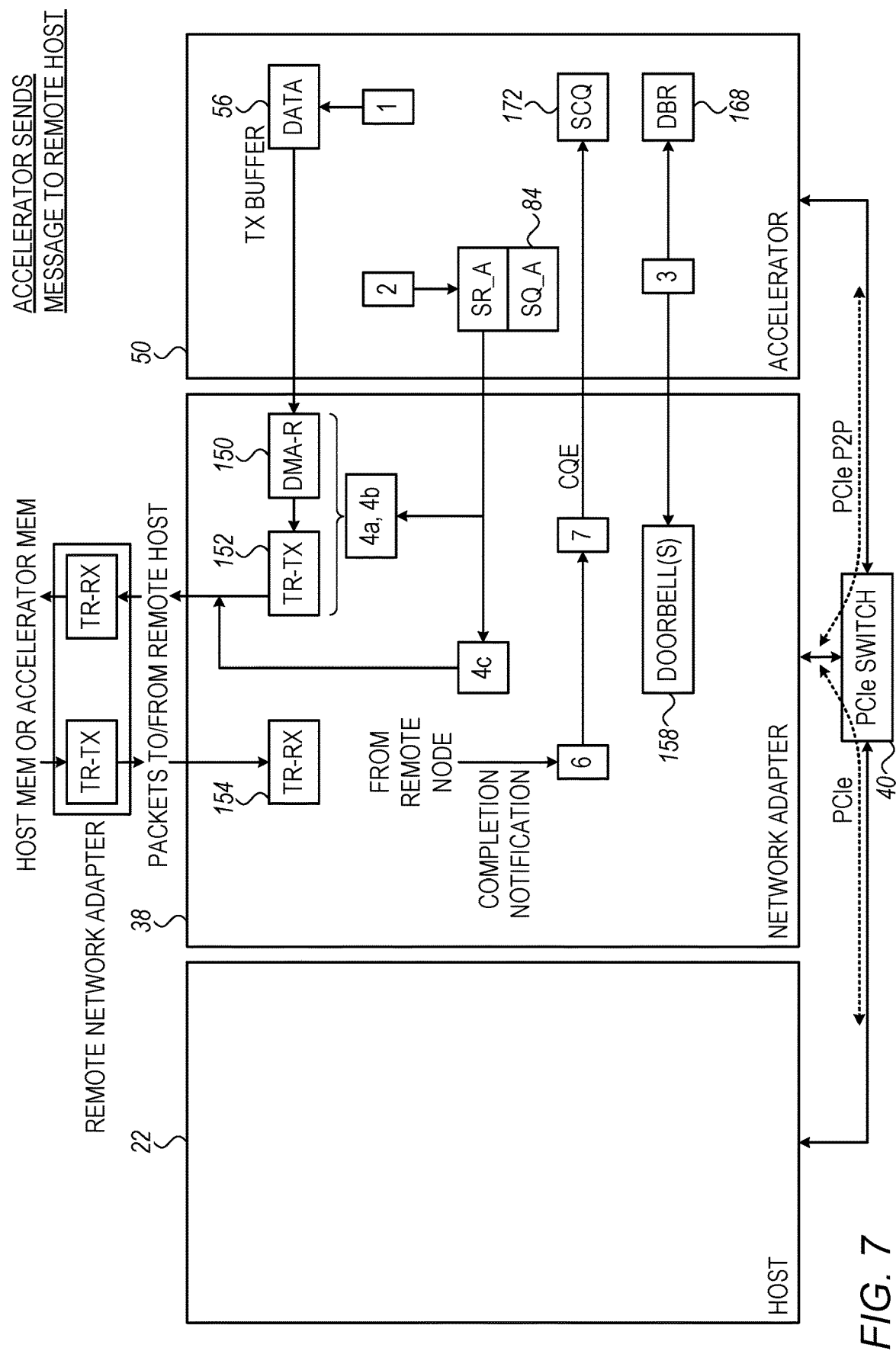

FIGS. 6 and 7 are diagrams that schematically illustrate elements and operations involved in RDMA communication between remote host 24 and local accelerator 50 via network adapter 38, in accordance with embodiments that are described herein.

Each of FIGS. 6 and 7 depicts host 22, network adapter and accelerator 50, all coupled via PCIe switch 40. Network adapter 38 and accelerator 50 communicate with one another in PCIe peer-to-peer mode.

In FIGS. 6 and 7, network adapter 38 comprises a DMA read module 150 (denoted DMA-R) for reading a message directly from a TX buffer 56. DMA-R 150 delivers data read from TX buffer 56 to a transport layer transmitter 152 (denoted TR-TX). Network adapter 38 further comprises a transport layer receiver 154 (denoted TR-RX) coupled to a DMA write module 156 (denoted DMA-W) having direct access to a RX buffer 58 in accelerator 50. In some embodiments, TR-TX 152 and TR-RX 156 are part of packet processing circuitry 46, and DMA-R 150 and DMA-W 156 are part of host interface 44. Note that DMA-R 150, TR-TX 152, TR-RX 156 and DMA-W 156 of FIGS. 6 and 7 may be the same or different from those of FIGS. 4 and 5 above.

In FIG. 6, a client 76 on remote host 24 (not shown) sends a message to local accelerator 50. A sequence of numbered operations involved in this transaction are described herein. It is assumed that driver 52 has configured a loopback between SRQ 86 and a QP used for communication with a remote network node. In FIG. 6, TR-RX 154 receives transport layer packets from remote host 24 over communication network 30. The sequence of operations thus comprises operations 4d, 4e, 5, 6, 7, 8 and 9 that are essentially similar to same numbered operations in FIG. 4. Note that operation number 8 in FIG. 6 differs from that of FIG. 4. In FIG. 6, network adapter 38 sends a CQE to remote host 24, whereas in FIG. 4 to host 22.

In FIG. 7, accelerator 50 sends a message to client 76 on remote host 24. A sequence of numbered operations involved in this transaction are described herein. It is assumed that driver 52 has configured a loopback between SQ 84 and a QP used for communication with a remote network node. In FIG. 7 TR-TX 152 sends the transport layer packets to remote host 24 over communication network 30.

The sequence of operations thus includes operations 1-4c, 6 and 7, which are essentially similar to same numbered operations in FIG. 5. Note that operations numbers 4c and 6 in FIG. 7 differ from those of FIG. 5. In operation 4c of FIG. 7, the transport layer packets produced by TR-RX 154 are transmitted to remote host 24 and are not looped back to the network adapter as in FIG. 5. In addition, operation 6 of FIG. 7, network adapter 38 receives a completion notification from remote host 24, and not from host 22 as in FIG. 5.

The configurations of computing system 20, communication network 30, network nodes 22 and 24, including CPU 32, network adapter 38, accelerator 50 and bus switching element 40 of FIGS. 1, 2A-2C, and 4-7 are given by way of example, which are chosen purely for the sake of conceptual clarity. In alternative embodiments, other suitable computing system, communication network, network nodes, CPU, network adapter, accelerator and bus switching element configurations can also be used.

Some elements of network node 22, network adapter 38, and accelerator 50 such as CPU 32, host memory 34, bus switching element 40, packet processing circuitry 46 including TR-TX 152 and TRX-RX 154 and Host interface 44 including DMA-R 150 and DMA-W 156, may be implemented in hardware, e.g., in one or more Application-Specific Integrated Circuits (ASICs) or Field-Programmable Gate Arrays (FPGAs). Additionally or alternatively, some elements of CPU 32, packet processing circuitry 46, host interface 44 and accelerator engine 55 can be implemented using software, or using a combination of hardware and software elements.

In some embodiments, some of the functions of each of CPU 32, packet processing circuitry 46, host interface 44 and accelerator engine 55 may be carried out by a general-purpose processor, which is programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory.

Each of host memory 34 and accelerator memory 54 may comprise any suitable type of storage such as, for example, a Random Access Memory (RAM). Elements that are not necessary for understanding the principles of the present disclosure, such as various interfaces, addressing circuits, timing and sequencing circuits and debugging circuits, have been omitted from the figure for clarity.

The embodiments described above are given by way of example, and other suitable embodiments can also be used. For example, although the embodiments above refer mainly to RDMA in IB networks, the embodiments are applicable similarly to RDMA in other networks such as, for example Ethernet networks using a suitable networking protocol such as RDMA over Converged Ethernet (RoCE) or IP networks using the iWARP protocol.

Although in the embodiments above the accelerator is assumed to be implemented in hardware, this is not mandatory. In alternative embodiments, a software-based accelerator can also be used for providing accelerated computations by exchanging messages over RDMA.

Although the embodiments described herein mainly address RDMA-based communication between an accelerator and local or remote client, the methods and systems described herein can also be used in other applications, such as in performing a complex accelerated function, e.g., in an Artificial Intelligence (AI) engine. For example, the complex function can be divided among multiple chained accelerators that each performs part of the calculation and provides its output to a subsequent accelerator or to the final destination.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network node, comprising:
a network adapter, comprising a network interface configured for connection to a packet communication network a host interface coupled to a host bus;
a computational accelerator, which is coupled to the host bus and comprises an accelerator memory and an accelerator engine, which is configured to perform, in response to notifications submitted to the computational accelerator by the network adapter, computational operations on data received by the network adapter from remote hosts via the network and written by the network adapter, in response to receive work queue elements (WQEs) in a shared receive queue (SRQ), to a shared receive buffer in the accelerator memory, and which is configured to write results of the computational operations to a transmit buffer in the accelerator memory and to post send WQEs in one or more send queues (SQs), which cause the network adapter to transmit the results over the network to the remote hosts; and
a central processing unit (CPU), which is coupled to the host bus and is configured to write the receive WQEs to the SRQ, to be read and executed by the network adapter.

2. The network node according to claim 1, wherein the CPU is configured to establish remote direct memory access (RDMA) links via the network adapter with the remote hosts, and to create queue pairs (QPs) comprising the SQs to be used by the computational accelerator in receiving the data and transmitting the results from and to the remote hosts.

3. The network node according to claim 2, wherein the CPU is configured to create the SRQ, which is shared among two or more of the QPs.

4. The network node according to claim 2, wherein the CPU is configured to create a further QP to be used in submitting work requests to the computational accelerator by a client process running locally on the CPU, such that the data to be processed in accordance with the work requests is conveyed by the network adapter from a host memory of the network node to the accelerator memory, and the results of the computations performed responsively to the work requests are looped back to the host memory by the network adapter in response to the send WQEs posted by the accelerator engine in the further QP.

5. The network node according to claim 1, wherein the network adapter is configured to apply transport-layer processing, in response to the receive WQEs and the send WQEs, to depacketize the data received from the network and packetize the results for transmission to the network.

6. The network node according to claim 1, wherein the notifications submitted to the computational accelerator by the network adapter comprise completion queue elements (CQEs), which are written by the network adapter to a completion queue in the accelerator memory after having consumed a receive WQE and written the data to the shared receive buffer in response to the receive WQE.

7. The network node according to claim 1, wherein the SRQ is a cyclic queue.

8. The network node according to claim 1, wherein the network node comprises a host memory, and wherein the SRQ is maintained in the host memory.

9. The network node according to claim 1, wherein the SRQ is maintained in the accelerator memory.

10. The network node according to claim 1, wherein the accelerator engine comprises hardware logic, and wherein the computational operations applied by the hardware logic to the received data are selected from a list of computations consisting of cryptographic operations, data compression, data decompression, mathematical operations, and logical operations.

11. A computational method, comprising:
receiving in a network adapter data transmitted via a packet communication network from remote hosts;
writing the data, in response to receive work queue elements (WQEs) in a shared receive queue (SRQ), over a host bus from the network adapter to a shared receive buffer in an accelerator memory of a computational accelerator;
writing the receive WQEs to the SRQ by a central processing unit (CPU), which is coupled to the host bus;
submitting notifications from the network adapter to the computational accelerator of computational operations to be performed on the data;
in response to the notifications, performing the computational operations in the computational accelerator and writing results of the computational operations to a transmit buffer in the accelerator memory;
posting, by the computational accelerator, send WQEs in one or more send queues (SQs); and
in response to the send WQEs, transmitting the results over the network by the network adapter to the remote hosts.

12. The method according to claim 11, wherein the method comprises establishing, by the CPU, remote direct memory access (RDMA) links via the network adapter with the remote hosts, and creating, by the CPU, queue pairs (QPs) comprising the SQs to be used by the computational accelerator in receiving the data and transmitting the results from and to the remote hosts.

13. The method according to claim 12, wherein the SRQ is created by the CPU and is shared among two or more of the QPs.

14. The method according to claim 12, wherein the method comprises:
creating, by the CPU, a further QP to be used in submitting work requests to the computational accelerator by a client process running locally on the CPU;

conveying the data that is to be processed by the computational accelerator in accordance with the work requests by the network adapter from a host memory of the CPU to the accelerator memory; and looping the results of the computations performed responsively to the work requests back to the host memory by the network adapter in response to the send WQEs posted by the computational accelerator engine in the further QP.

15. The method according to claim 11, wherein receiving the data and transmitting the results comprise apply, by the network adapter, transport-layer processing in response to the receive WQEs and the send WQEs, so as to depacketize the data received from the network and packetize the results for transmission to the network.

16. The method according to claim 11, wherein submitting the notifications comprises posting completion queue elements (CQEs) by the network adapter to a completion queue in the accelerator memory after having consumed a receive WQE and written the data to the shared receive buffer in response to the receive WQE.

17. The method according to claim 11, wherein the SRQ is a cyclic queue.

18. The method according to claim 11, wherein the SRQ is maintained in a host memory of the CPU.

19. The method according to claim 11, wherein the SRQ is maintained in the accelerator memory.

20. The method according to claim 11, wherein the accelerator engine comprises hardware logic, and wherein performing the computational operations comprises applying by the hardware logic to the received data an operation selected from a list of computations consisting of cryptographic operations, data compression, data decompression, mathematical operations, and logical operations.

* * * * *